United States Patent
Kikuchi

(10) Patent No.: US 7,119,147 B2
(45) Date of Patent: *Oct. 10, 2006

(54) RUBBER COMPOSITION

(75) Inventor: Naohiko Kikuchi, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/341,482

(22) Filed: Jan. 14, 2003

(65) Prior Publication Data

US 2004/0211111 A1    Oct. 28, 2004

(30) Foreign Application Priority Data

Jan. 17, 2002    (JP) .............................. 2002-008809

(51) Int. Cl.
  *C08K 5/103*    (2006.01)
  *C08L 21/00*    (2006.01)
  *B60C 1/00*    (2006.01)

(52) U.S. Cl. ....................... 525/193; 525/315

(58) Field of Classification Search ................ 525/193, 525/315
See application file for complete search history.

(56) References Cited

U.S. PATENT DOCUMENTS

| 5,252,649 A | 10/1993 | Hausmann |
| 5,604,290 A | 2/1997 | Aikawa et al. |
| 2002/0019478 A1 | 2/2002 | Ohyama et al. |
| 2003/0100661 A1* | 5/2003 | Kikuchi et al. .............. 524/492 |

FOREIGN PATENT DOCUMENTS

| EP | 561761 A1 * | 9/1993 |
| EP | 0 677 548 A1 | 10/1995 |
| EP | 1 085 049 A2 | 3/2001 |
| EP | 1 209 194 A1 | 5/2002 |
| EP | 1 234 852 A1 | 8/2002 |
| JP | 55112247 A * | 8/1980 |
| JP | 58-74731 A | 5/1983 |
| JP | 6-31546 A | 2/1994 |
| JP | 7-216140 A | 8/1995 |
| JP | 8-302077 A | 11/1996 |
| JP | 2001-81243 A | 3/2001 |

OTHER PUBLICATIONS

Derwent abstract ACC-NO:1993-297020, for EP 561761-A1, Hausmann (Sep. 22, 1993).*
USPTO obtained translation of EP 561761-A1 (Sep. 22, 1993), Hausmann, Bernadette Dr.*
Derwent abstract ACC-NO: 1980-72551C, of JP 55-112247-A.*
USPTO obtained translation of JP 60-031546-A.*
Derwent machine assisted translation of JP 7-18120-A.*
Abstract XP-002240318 of reference JP 62 004732 A.
Abstract for Publication No. JP 62 241933 A.

* cited by examiner

*Primary Examiner*—Matthew A. Thexton
(74) *Attorney, Agent, or Firm*—Birch, Stewart, Kolasch & Birch, LLP

(57) ABSTRACT

A rubber composition which prevents the rise in rubber hardness over time and can maintain good performance on snow and ice over a long period, which includes (A) a diene rubber containing, as a main component, at least one member selected from the group consisting of natural rubber and butadiene rubber, and (B) 5 to 60 parts by weight of vegetable oil which has an iodine value of at least 80 and contains at least 70% by weight of unsaturated fatty acid having at least 18 carbon atoms, based on 100 parts by weight of the diene rubber (A), the rubber composition having a tan δ peak temperature Tg of at most −50° C. and a rubber hardness of at most 64 at 0° C. The present invention also relates to a pneumatic tire using the rubber composition as the tread.

10 Claims, No Drawings

RUBBER COMPOSITION

BACKGROUND OF THE INVENTION

The present invention relates to a rubber composition and a tire using the rubber composition as the tread. More specifically, the present invention relates to a rubber composition, which can prevent a rise in rubber hardness over time and maintain good snow and ice performance over a long period of time, and a tire which uses the rubber composition as a tire tread.

In snow tire development, a tire, which can be stably used over a long period on snow and ice in wintertime, is in demand. For example, known is the technical art of maintaining low rolling resistance and wet skid resistance while improving traction and braking performance on snow and ice surfaces, by compounding rape seed oil as a softening agent to a rubber composition containing styrene-butadiene rubber (SBR) as a main component (JP-A-8-302077). However, in a rubber composition containing SBR as a main component, because tan δ peak temperature Tg becomes higher than −50° C. and hardness at a low temperature rises, sufficient performance on snow and ice could not be obtained.

A rubber composition obtained by compounding palm oil in the rubber component comprising natural rubber and butadiene rubber is also known (JP-A-58-74731). However, in a tire made from a rubber composition compounded with palm oil, rubber hardness at a low temperature became high and performance on snow and ice could not be maintained over a long period of time.

As stated above, the technical art of maintaining performance on snow and ice over a long period is still not quite satisfactory.

SUMMARY OF THE INVENTION

The object of the present invention is to provide a rubber composition which can prevent a rise in rubber hardness over time and maintain good snow and ice performance over a long period of time.

In the present invention, the particular property of vegetable oil having difficulty escaping from vulcanized rubber is utilized and the vegetable oil is used as a softening agent. Accordingly, the rubber hardness at low temperature becomes low, a rise in rubber hardness over time can be prevented and good snow and ice performance can be maintained over a long period of time.

That is, the present invention relates to a rubber composition comprising (A) a diene rubber containing at least one member selected from the group consisting of natural rubber and butadiene rubber and (B) 5 to 60 parts by weight of vegetable oil which has an iodine value of at least 80 and contains at least 70% by weight of unsaturated fatty acid having at least 18 carbon atoms, based on 100 parts by weight of the diene rubber (A), the rubber composition having a tan δ peak temperature Tg of at most −50° C. and a rubber hardness of at most 64 at 0° C.

The aforesaid vegetable oil (B) is preferably at least one member selected from the group consisting of cotton seed oil, rape seed oil, corn oil, sesame oil, soya bean oil, safflower oil and linseed oil.

The amount of the natural rubber and butadiene rubber in the aforesaid diene rubber (A) is preferably at least 80% by weight.

The present invention also relates to a pneumatic tire using the aforesaid rubber composition as the tread.

DETAILED DESCRIPTION

The rubber composition of the present invention contains a specific diene rubber (A) and a specific vegetable oil (B) and has a tan δ peak temperature Tg of at most −50° C. and a rubber hardness of at most 64 at 0° C.

As the diene rubber (A), a diene rubber containing, as a main component, at least one member selected from the group consisting of natural rubber (NR) and butadiene rubber (BR) is used. Herein, the term "as a main component" refers to the case where the diene rubber contains at least 50% by weight of the component. When the aforesaid main component is less than 50% by weight, because Tg rises and hardness at a low temperature rises, performance on snow and ice decreases. Therefore, from the viewpoint of improving low temperature properties, the amount of natural rubber and butadiene rubber within the diene rubber is preferably at least 80% by weight.

The diene rubber (A) may also contain a rubber component other than the main component mentioned above. For example, the diene rubber (A) may contain a rubber component such as 1,2-butadiene rubber other than the above butadiene rubbers, styrene-butadiene copolymer rubber (SBR), butyl rubber (IIR), halogenated butyl rubber, acrylonitrile-butadiene rubber (NBR), acrylonitrile-styrene-butadiene copolymer rubber, chloroprene rubber, ethylene-propylene copolymer rubber, styrene-isoprene copolymer rubber, styrene-isoprene-butadiene copolymer rubber, isoprene-butadiene copolymer rubber, chlorosulfonated polyethylene rubber, acrylic rubber, epichlorohydrine rubber, silicone rubber or urethane rubber. These can be used alone or in combination of two or more. There is no particular limit to the mixing ratio in mixing.

The specific vegetable oil (B) has an iodine value of at least 80, preferably at least 100 and at most 200. When the iodine value is less than 80, the rubber softening effect is small. In this case, the vegetable oil also easily bleeds on the vulcanized rubber and when heat aging, the rise in rubber hardness is large.

The vegetable oil (B) contains at least 70% by weight, preferably at least 80% by weight, of an unsaturated fatty acid component having at least 18 carbon atoms. When the amount of the unsaturated fatty acid having at least 18 carbon atoms is at least 70% by weight, in addition to obtaining a softening effect by adding the vegetable oil, the rise in rubber hardness by heat aging can be controlled as the vegetable oil experiences difficulty escaping from the rubber because of the double bond reaction. On the other hand, when the amount is less than 70% by weight, the congealing point of the vegetable oil rises, making the low temperature properties decrease.

The number of carbon atoms in the unsaturated fatty acid contained in the vegetable oil is at least 18. When the number of carbon atoms in the unsaturated fatty acid is less than 18, low temperature properties decrease when the vegetable oil is added, because the melting point becomes high.

Examples of this vegetable oil are olive oil, cotton seed oil, rape seed oil, corn oil, sesame oil, soya bean oil, safflower oil, linseed oil and the like. Among these, from the viewpoint of containing a great deal of the unsaturated fatty acid component having at least 18 carbon atoms, at least one kind of vegetable oil selected from the group consisting of cotton seed oil, rape seed oil, corn oil, sesame oil, soya bean oil, safflower oil and linseed oil is preferable. At least one kind of vegetable oil selected from the group consisting of rape seed oil, corn oil, sesame oil, soya bean oil, safflower oil and linseed oil is more preferable.

The vegetable oil (B) is compounded in an amount of 5 to 60 parts by weight, more preferably 5 to 40 parts by weight, based on 100 parts by weight of the diene rubber component. When the amount of the compounded vegetable oil is less than 5 parts by weight, the effect of decreasing the rubber hardness at a low temperature by adding the vegetable oil is not sufficient and improvement of performance on snow and ice cannot be expected. When the amount of the compounded vegetable oil exceeds 60 parts by weight, the viscosity of the rubber composition decreases so much that processability decreases.

The vegetable oil (B) can keep rubber hardness low at a low temperature and thus initial performance on snow and ice becomes good. Furthermore, because the vegetable oil has difficulty escaping from vulcanized rubber when added to rubber and can exhibit a softening effect over a long period, good performance on snow and ice can be maintained.

To the rubber composition of the present invention, a softening agent other than the vegetable oil (B) may be compounded. Examples of the softening agent other than the vegetable oil (B) are softening agents usually used in the rubber industry such as aromatic oil, naphthenic oil and paraffin oil.

In the rubber composition of the present invention, the tan δ peak temperature Tg after vulcanization is at most −50° C., preferably −50° to −70° C. When Tg is higher than −50° C., low temperature properties decrease. When Tg is lower than −70° C., gripping on wet road surfaces tend to be inferior.

Furthermore, in the rubber composition of the present invention, the rubber hardness after vulcanization at 0° C. is at most 64, preferably 40 to 60. When the rubber hardness at 0° C. is higher than 64, sufficient performance on snow and ice cannot be obtained. When the rubber hardness at 0° C. is lower than 40, the rigidity of the tread is low, and the abrasion resistance tends to decrease.

To the rubber composition of the present invention may also be added fillers such as carbon black, silica, clay and aluminum hydroxide. Additives such as antioxidants, stearic acid, zinc oxide and wax, and vulcanizers such as sulfur and vulcanization accelerators may be suitably compounded.

The rubber composition of the present invention is obtained by kneading the aforesaid rubber component, vegetable oil and other compounding agents using a usual processing machine such as a roll, Banbury mixer or a kneader.

The tire of the present invention is prepared according to the usual manner by using the aforesaid rubber composition as the tread. The aforesaid rubber composition in an unvulcanized state is extrusion molded in the form of the tire tread and is then laminated together in the usual method on a tire forming machine to form an unvulcanized tire. This unvulcanized tire is heated and pressurized within the vulcanizer to obtain the tire. The tire obtained in this way can exhibit a softening effect over a long period and therefore maintain good performance on snow and ice.

EXAMPLES

The present invention is explained in detail based on Examples below, but not limited thereto. In Examples and Comparative Examples the following materials were used.

(Vegetable Oil)
Linseed oil: N/B Linseed Oil available from Nisshin Oillio, Ltd. (Iodine Value 191, unsaturated fatty acid component having at least 18 carbon atoms: 91.5%)
Soya bean oil: Refined Soya Bean Oil (S) available from Nisshin Oillio, Ltd. (Iodine Value: 131, unsaturated fatty acid component having at least 18 carbon atoms: 84.9%)
Corn oil: Corn Salad Oil available from Nisshin Oillio, Ltd. (Iodine Value: 121, unsaturated fatty acid component having at least 18 carbon atoms: 84.8%)
Rape seed oil: Refined Rape Seed Oil (S) available from Nisshin Oillio, Ltd. (Iodine Value 116, unsaturated fatty acid component having at least 18 carbon atoms: 91.3%)
Palm oil: Purified Palm Oil J(S) available from Nisshin Oillio, Ltd. (Iodine Value: 52, unsaturated fatty acid component having at least 18 carbon atoms: 49.7%)
Cocoanut oil: Purified Cocoanut Oil (S) available from Nisshin Oillio, Ltd. (Iodine Value: 9, unsaturated fatty acid component having at least 18 carbon atoms: 7.1%)

(Other Materials)
NR: RSS #1
BR: BR 150L available from Zeon Corporation
SBR: SBR1502 available from Sumitomo Chemical Co., Ltd.
Carbon Black: SHOBLACK N 339 available from Showa Cabot Co. Ltd.
Silica: VN3 available from Degussa Co.
Silane Coupling Agent TESPT: Si-69 available from Degussa Co.
Aromatic Oil: Process X-140 available from Japan Energy Corporation
Naphthenic Oil: Process P-200 available from Japan Energy Corporation
Antioxidant: Ozonone 6C available from Seiko Chemicals Co., Ltd.
Wax: SUN NOC Wax available from Ohuchi Shinko Kagaku Kogyo Co., Ltd.
Stearic Acid: KIRI available from NOF Corporation
Zinc oxide: Zinc Oxide 2 available from Mitsui Mining and Smelting Co., Ltd.
Sulfur: powdery sulfur available from Karuizawa Iou Kabushiki Kaisha
Vulcanization Accelerator: Nocceler CZ available from Ohuchi Shinko Kagaku Kogyo Co., Ltd.

Examples 1 to 5 and Comparative Examples 1 to 5

According to the compound represented in Table 1, the rubber composition was prepared by kneading each component in a Banbury mixer and a sample was made by vulcanizing for 25 minutes at 165° C. Using this sample, rubber properties (tan δ peak temperature (Tg), rubber hardness) were measured (evaluated) according to the following methods.

(Tan δ Peak Temperature Tg)
Using a viscoelastometer available from Iwamoto Corporation, the tan δ peak temperature was found from the temperature distribution curve of tan δ measured under the conditions of a frequency of 10 GHz, an initial strain of 10%, an amplitude of ±0.25%, and a temperature rising speed of 2° C./minute.

(Rubber Hardness at Room Temperature and 0° C.)
Rubber hardness at both 0° C. and room temperature was measured by a Type A durometer in accordance with JIS K6253. The lower the rubber hardness at 0° C. is, the better the performance on snow and ice. The rubber hardness at room temperature refers to rubber hardness measured at 23° C.

(Rubber Hardness After Heat Aging)

After heat aging for 14 days in an oven of 85° C., rubber hardness after cooling to room temperature was measured by a Type A duro-meter in accordance with JIS K6253. The initial performance can be maintained over a long period the smaller the change in rubber hardness after heat aging is.

The results are indicated in Table 1.

In comparison, in the Examples, by using the specific vegetable oil, the softening effect of the rubber was great, the rise in rubber hardness after heat aging was small, the rubber hardness at 0° C. was kept low and a rubber composition with good performance on snow and ice over a long period was obtained.

According to the present invention, by using a rubber component containing a large amount of NR and BR and a specific vegetable oil as a softening agent, a rise in rubber hardness over time can be prevented and a rubber compo-

TABLE 1

|  | Ex. | | | | | Com. Ex. | | | | |
| --- | --- | --- | --- | --- | --- | --- | --- | --- | --- | --- |
|  | 1 | 2 | 3 | 4 | 5 | 1 | 2 | 3 | 4 | 5 |
| Compound (part by weight) | | | | | | | | | | |
| NR | 70 | 70 | 70 | 70 | 70 | 70 | 70 | 70 | 70 | 70 |
| BR | 30 | 30 | 30 | 30 | 30 | 30 | 30 | 30 | 30 | — |
| SBR | — | — | — | — | — | — | — | — | — | 30 |
| Carbon black | 30 | 30 | 30 | 30 | 30 | 30 | 30 | 30 | 30 | 30 |
| Silica | 20 | 20 | 20 | 20 | 20 | 20 | 20 | 20 | 20 | 20 |
| Silane coupling agent | 1.6 | 1.6 | 1.6 | 1.6 | 1.6 | 1.6 | 1.6 | 1.6 | 1.6 | 1.6 |
| Linseed oil | 30 | — | — | — | 20 | — | — | — | — | — |
| Soya bean oil | — | 30 | — | — | — | — | — | — | — | — |
| Corn oil | — | — | 30 | — | — | — | — | — | — | — |
| Rape seed oil | — | — | — | 30 | — | — | — | — | — | 30 |
| Palm oil | — | — | — | — | — | — | — | 30 | — | — |
| Cocoanut oil | — | — | — | — | — | — | — | — | 30 | — |
| Aromatic oil | — | — | — | — | — | 30 | — | — | — | — |
| Naphthenic oil | — | — | — | — | — | — | 30 | — | — | — |
| Antioxidant | 2.0 | 2.0 | 2.0 | 2.0 | 2.0 | 2.0 | 2.0 | 2.0 | 2.0 | 2.0 |
| Wax | 2.0 | 2.0 | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 | 3.0 | 3.0 |
| Sulfur | 1.5 | 1.5 | 1.5 | 1.5 | 1.5 | 1.5 | 1.5 | 1.5 | 1.5 | 1.5 |
| Vulcanization accelerator | 1.0 | 1.0 | 1.0 | 1.0 | 1.0 | 1.0 | 1.0 | 1.0 | 1.0 | 1.0 |
| Rubber properties | | | | | | | | | | |
| Tg (° C.) | −60 | −59 | −58 | −59 | −59 | −52 | −58 | −54 | −54 | −48 |
| Rubber hardness at room temperature | 43 | 44 | 42 | 45 | 48 | 49 | 48 | 48 | 48 | 47 |
| Rubber hardness after heat aging | 47 | 48 | 47 | 50 | 51 | 56 | 59 | 57 | 57 | 52 |
| Change in rubber hardness from room temperature after heat aging | +4 | +4 | +5 | +5 | +3 | +7 | +11 | +9 | +9 | +5 |
| Rubber hardness at 0° C. | 46 | 47 | 45 | 48 | 52 | 53 | 51 | 56 | 60 | 58 |
| Change in rubber hardness from room temperature to 0° C. | +3 | +3 | +3 | +3 | +4 | +4 | +3 | +8 | +12 | +11 |

In Comparative Example 1, in which a specific vegetable oil is not used as a softening agent, the rise in rubber hardness after heat aging is great and rubber hardness at a low temperature is high as well. The result is thus unfavorable. In the same way, in Comparative Example 2, though the rise in rubber hardness from room temperature to low temperature (0° C.) is small, the rise in rubber hardness after heat aging is great.

In Comparative Example 3 in which a vegetable oil of a small iodine value is used, the rise in rubber hardness both after heat aging and at low temperatures has not been improved. Furthermore, Comparative Example 4, in which the amount of unsaturated fatty acid component having at least 18 carbon atoms is small, is unfavorable as the rise in rubber hardness at a low temperature is particularly large.

The rise in rubber hardness at a low temperature is also high in Comparative Example 5, in which the amount of the natural rubber and butadiene rubber contained is small and the tan δ peak temperature Tg is higher than −50° C. though a specific vegetable oil is used.

sition which can maintain good performance on snow and ice over a long period can be obtained.

What is claimed is:

1. A rubber composition comprising:
   (A) a diene rubber containing, as a main component, at least one member selected from the group consisting of natural rubber and butadiene rubber, and
   (B) 5 to 60 parts by weight of vegetable oil which has an iodine value of at least 80 and contains at least 70% by weight of unsaturated fatty acid having at least 18 carbon atoms, based on 100 parts by weight of the diene rubber (A),
   said rubber composition having a tan δ peak temperature Tg of at most −50° C. and a rubber hardness of at most 52 at 0° C.

2. The rubber composition of claim 1, wherein said vegetable oil (B) is at least one member selected from the group consisting of cotton seed oil, rape seed oil, corn oil, sesame oil, soya bean oil, safflower oil and linseed oil.

3. The rubber composition of claim 1 or 2, wherein the amount of said natural rubber and butadiene rubber in said diene rubber (A) is at least 80% by weight.

4. A pneumatic tire comprising the rubber composition of claim 1 as a tread.

5. A pneumatic tire comprising the rubber composition of claim 2 as a tread.

6. A pneumatic tire comprising the rubber composition of claim 3 as a tread.

7. The rubber composition of claim 1 having a rubber hardness of 40 to 52 at 0° C.

8. The rubber composition of claim 1, wherein said vegetable oil is present in an amount of from 5 to 40 parts by weight.

9. A pneumatic tire tread having a composition which comprises (A) a diene rubber containing, as a main component, at least one member selected from the group consisting of natural rubber and butadiene rubber, and (B) 5 to 60 parts by weight of vegetable oil which has an iodine value of at least 80 and contains at least 70% by weight of unsaturated fatty acid having at least 18 carbon atoms, based on 100 parts by weight of the diene rubber (A), said rubber composition having a tan δ peak temperature Tg of at most −50° C. and a rubber hardness of at most 52 at 0° C.

10. The pneumatic tire tread according to claim 9, wherein said vegetable oil is present in an amount of from 5 to 40 parts by weight.

* * * * *